United States Patent [19]
Schilling

[11] 4,047,632
[45] Sept. 13, 1977

[54] PRESSURE VESSEL ESPECIALLY FOR A NUCLEAR REACTOR

[75] Inventor: Franz Schilling, Kempen, Germany

[73] Assignee: Siempelkamp Giesserei KG, Krefeld, Germany

[21] Appl. No.: 635,637

[22] Filed: Nov. 26, 1975

[30] Foreign Application Priority Data

Nov. 28, 1974 Germany .................. 2456379

[51] Int. Cl.² .................................. B65D 45/00
[52] U.S. Cl. ............................. 220/3; 176/30;
 176/87; 220/71; 220/315; 220/328; 292/256.71
[58] Field of Search .............. 220/3, 315, 71, 327,
 220/328; 52/245, 246, 249; 110/64, 68, 76, 85;
 292/256.6, 256.71, 256.73; 85/69, 70; 176/87, 30

[56] References Cited

U.S. PATENT DOCUMENTS

| 521,475 | 6/1894 | Orvis | 110/64 |
|---|---|---|---|
| 2,737,309 | 3/1956 | Miller | 220/5 A |
| 2,803,984 | 8/1957 | Swenson | 85/70 |
| 3,256,069 | 6/1966 | Peterson | 220/3 |
| 3,433,382 | 3/1969 | Boggio | 220/3 |
| 3,515,419 | 6/1970 | Baugh | 85/70 |
| 3,552,789 | 1/1971 | Evans | 292/256.6 |
| 3,683,574 | 8/1972 | Vaessen | 52/249 |
| 3,764,039 | 10/1973 | Jorgensen | 220/3 |

FOREIGN PATENT DOCUMENTS

| 1,041,041 | 9/1966 | United Kingdom | 176/87 |
|---|---|---|---|

*Primary Examiner*—William Price
*Assistant Examiner*—Allan N. Shoap
*Attorney, Agent, or Firm*—Karl F. Ross

[57] ABSTRACT

A pressure vessel, containment or burst shield for a nuclear reactor has a substantially circular cover (closing the top or bottom of a cylindrical casing or shell) comprised of a plurality of layers, each formed from a multiplicity of segments meeting a central part. The adjoining segments of each layer meet at joints which are staggered with respect to the joints of the adjacent layers above or below and hence no continuous crevices are provided through the cover. Tension members extend through aligned passages of the several layers and provide support against shear and thrust forces.

6 Claims, 9 Drawing Figures

PRESSURE VESSEL ESPECIALLY FOR A NUCLEAR REACTOR

CROSS REFERENCE TO RELATED APPLICATION

This application is related to the commonly assigned copending application Ser. No. 586,601, filed by Franz Schilling (the present Applicant) (now abandoned) and Burkhard Beine for a METHOD OF MOUNTING A LINER IN A BURST SHIELD OF A NUCLEAR REACTOR and to commonly assigned copending application Ser. No. 569,157 filed Apr. 18, 1975 by Burkhard Beine and Franz Schilling, the latter application being entitled BURST SHIELD CONTAINMENT FOR NUCLEAR REACTOR AND METHOD OF OPERATING SAME. These applications also make reference to the commonly assigned then-pending applications Ser. Nos. 441,491 and 441,492, both of Feb.11, 1974 (U.S. Pat. Nos. 3,963,565 and 3,963,563, both issued June 15, 1976).

FIELD OF THE INVENTION

The present invention relates to a pressurizable vessel and, more particularly, to a pressure vessel for a nuclear reactor, e.g. a vessel of the type described in the aforementioned applications which may be fitted with a liner and may receive the core of a pressurized-water or other type of nuclear reactor, such vessels have also been termed "containment" and "burst shields" since they act to confine the products of a breakdown of a reactor or leakage therefrom.

The cylindrical part of the pressurized vessel may, as described in the aforementioned applications, be assembled from circular cylinder segments which are disposed coaxially and are generally prestressed by cables or the like extending circumferentially and/or axially to resist outwardly directed forces.

Particularly, the present system is concerned with the covers of such reactors.

The term "cover" is here used to refer to the top or bottom member of the pressurized vessel closing the respective end of the cylindrical shell or structure making up the cylindrical wall thereof. When the cylindrical vessel is upright, the cover may span the top end or form the bottom of the vessel. Thus, when reference is made here to the "cover" it should be noted that either the top or bottom members are contemplated and when reference is made to a pressurized vessel it is preferred that both the top cover and the bottom cover be formed with the improved configuration.

BACKGROUND OF THE INVENTION

It has heretofore been proposed to form the cover of a pressurized vessel and a nuclear reactor from a plurality of cover sections which are assembled and are tensioned together by tractive or tensioning arrangements extending through passages in the cover sections.

The cover sections can be composed of concrete, steel-reinforced concrete, cast iron or cast steel, but preferably are composed of sections of cast steel.

The cover can be mounted upon the cylindrical shell of the vessel by tension cables extending through the cover, the cables running parallel to the axis or generatrices of the cylindrical vessel and serving in part as the axial pretensioning means of the cylindrical portion.

In the conventional construction of the cover, cover sections are sectors of a circle lying in a single layer and held in coplanarity by shear resisting keys or wedges which take up the shear forces between adjoining cover sections. The keys have a rectangular cross section orthogonal to the key axes and the transfer of shear forces is effected in only one dimension (transverse to the axis), resulting in the application of high edge forces to the keys and the cover sections. When efforts to prestress such covers radially are made, it is found that it is impossible to obtain a predetermined or prestress in central regions of the cover and, regardless of how the single layer body forming the cover is constructed, there is a tendency for the central portion of the latter to belly vertically and render the prestress ineffective.

OBJECTS OF THE INVENTION

It is the principal object of the present invention to provide an improved pressure vessel, especially for a nuclear reactor, in which the aforementioned disadvantages no longer arise.

Still another object of the invention is to provide a cover for a pressure vesssel of the type described with improved force flow in the cover and in which prestressing and other forces can be established in a predetermined manner without the danger that they will be rendered ineffective.

Still another object of the invention is to provide a cover for a pressure vessel with improved security at the joints between the sections of the cover.

It is also an object of the invention to provide a relatively simple and inexpensive cover structure for the purposes described in which central bulging can be minimized.

SUMMARY OF THE INVENTION

These objects and others which will become apparent hereinafter are attained, in accordance with the present invention, in a pressure vessel, especially adapted to receive the core of a nuclear reactor, which comprises a circularly cylindrical pressure-vessel shell and at least one cover secured to the shell at an end thereof, the cover being assembled from a plurality of cover sections which are drawn together by tension or tractive arrangements traversing passages in the sections.

The invention resides in providing the cover in a plurality of substantially planar layers, each of which comprises a central member and a plurality of sectoral members disposed around the central member and in mutually abutting relationship, the sectoral members abutting the central member of the respective layer as well. The joints formed at the abutting surfaces of adjacent members of each layer are staggered with respect to the joints of adjoining layers above and below so that there is no alignment of the joints from layer to layer.

The tensioning passages are throughgoing through the entire cover, i.e. are made up of registering passages of the layers to receive tractive or tensioning arrangements which are capable of transfering shear and thrust stresses as well as torsional shearing stress, otherwise known as shear strain or tangential stress. The force transmission between the layers is thus effected in all directions by the tension arrangements.

According to the invention, the tension arrangements act in the first instance two dimensionally in the plane of the respective layers or, more accurately, in planes parallel to the layers, i.e. in two directions, to transfer or absorb shear forces.

However, they are also effective parallel to the axis of the tension passage and thus in the third dimension because they frictionally and forcibly engage the wall of the passage.

As a result of the configuration described above the joints between members of each layer no longer form singular locations from a static point of view. In spite of the fact that the cover is made up of a large number of segments, i.e. the sum total of the segments of all of the layers, the cover has a statically unitary character and a strength which equals or exceeds that of a monolithic cover without the problems arising therewith. The members can be composed of concrete, cast steel, cast iron or combinations thereof although preferably cast iron is used.

I prefer to avoid alignment of the joints of adjacent superposed layers by making the central member and the sectoral members of the layers of the same shape but of different sizes. Consequently, the central member can be polygonal and the apex angles of the sectors can be defined by the central angle of a corresponding side of the central member. The central members and sectors of two or more of the layers may be geometrically similar but of different sizes as indicated. Of course, one or more of the layers may have a central member of a greater or lesser number of sides with the angles of the corresponding sectors modified accordingly.

Advantageously, the cover comprises at least three layers and the passages in the members of the respective layers are so disposed that a uniform azimuthal offsetting of the layers relative to one another can be established by alignment of the passages to provide the necessary offsetting of the joints. This arrangement also allows structural requirements of the cover to be considered in the assembling thereof.

The tension devices used in the system of the present invention have been found to be especially important since they provide the means whereby three-dimensional stress transfer and absorption can be effected. The tension device comprises, according to an important feature of the invention, an upsetting sleeve which is snugly receivable in the aligned passages of the several layers and a tension cable or bolt bearing on opposite ends of this sleeve, thereby causing the wall thereof to bear outwardly upon the wall of the passage. As a consequence, the upper and lower layers are tractively drawn together by the cable while the sleeves frictionally engage the walls of all of the layers.

In general I prefer to use circularly cylindrical upsetting sleeves and corresponding cross-section passages which can be made by boring easily and without special concern for the tolerances.

The tension devices may use, instead of cables, tension bolts which bear upon the walls of the passages themselves when, for example, the bolts are supercooled before insertion or the cover sections are thermally shrunk onto the bolts.

One of the advantages of the present system is that it allows a radial prestressing of the cover without bulging in the middle thereof because of the laminated character of the sections. Moreover, any desired prestress can be obtained by using layers or sections within layers of different materials and utilizing the temperature change of the cover to bring about the desired stressing. Furthermore, the use of different materials allows this stress to be applied in the several layers or at different locations within a layer as may be desired for the optimum strength of the cover.

The multilayer arrangement also allows the individual layers to be selected for different functions. Thus, when the cylindrical shell of the vessel is provided with, for example, a steel-sheet lining, the innermost layer of the cover can also be composed of steel sheet and can be welded to the lining of the cylindrical shell. It is preferred, in this case, to make the innermost layer in the form of large sheets or sections.

The principal advantage of the present invention is that the force transmission and transfer within the cover is vastly improved of multilayer cover structures whether formed monolithically or forming a multiplicity of segments and further that the advantages obtained of a section cover without the singular defect of throughgoing joints between sections. The cover can be simply mounted and dismounted, e.g. by releasing the tension devices. All edge pressures are eliminated when the upsetting sleeves and the tension bolts are of circular cross section. Furthermore the upsetting sleeves can be of reduced cross section in the regions of the interfaces between the layers to further limit the possibility that edge stress will be applied.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 7:
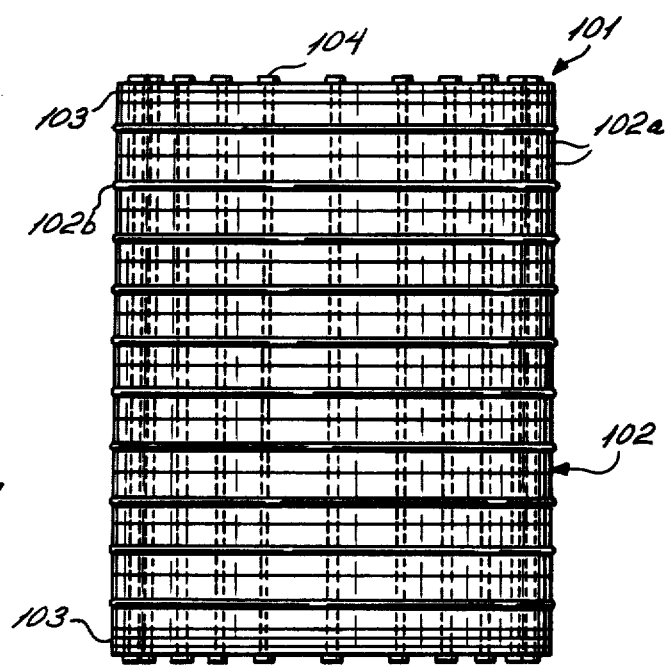
FIG. 7 is an elevational view of a pressure vessel for a nuclear reactor embodying the present invention.

Referring first to FIG. 7 it can be seen that a pressure vessel and a nuclear reactor as described in the aforementioned copending application can comprise a cylindrical structure 102 composed of individual cast iron rings 102a which may be prestressed inwardly by tension cables 102b running around the periphery of these rings. At the top and bottom there is provided a cover disk 103, each cover disk being composed of a plurality of layers and being held in place by axially extending tension cables 104.

The overall pressure vessel is designated at 101 in FIG. 7.

Figure 3:
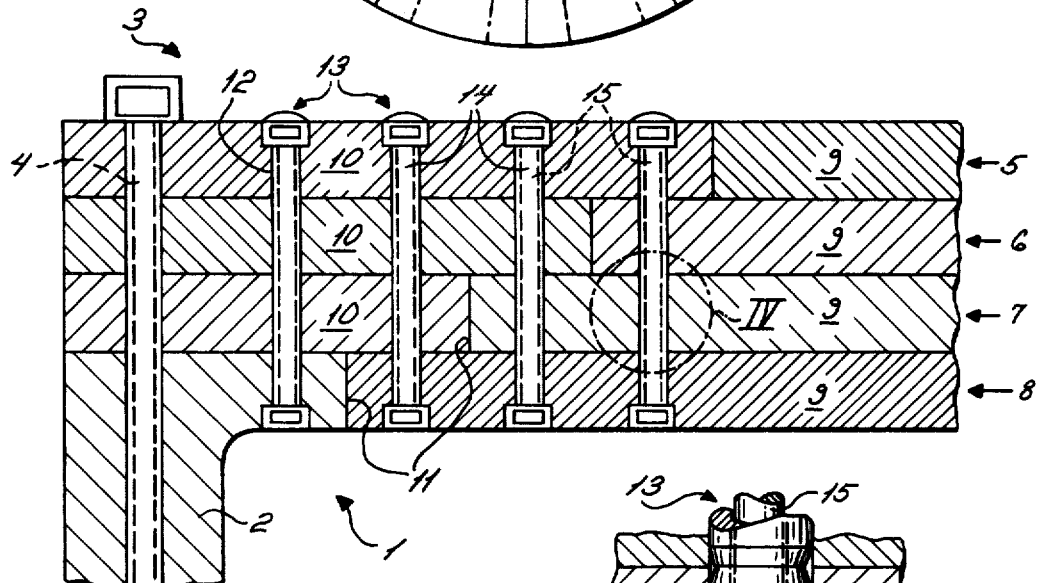
FIG. 3 is a cross-sectional view taken generally along the line III—III of FIG. 2.

From FIG. 3 it will be apparent that such a pressure vessel 1 can comprise the circularly cylindrical shell 2 and a cover 3 on at least one end thereof. As described in connection with FIG. 7, a second cover can be provided at the bottom of this vessel.

Figure 1A:
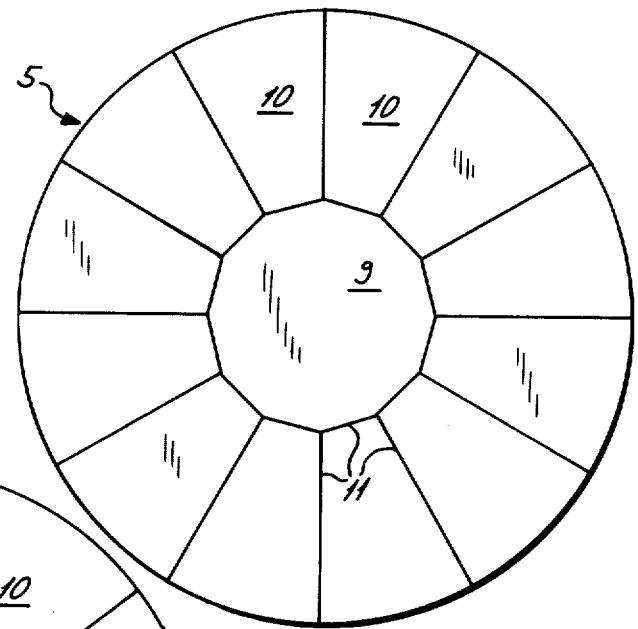
FIG. 1A is a plan view of the top layer of a circular-disc cover according to the invention.
Figure 1B:
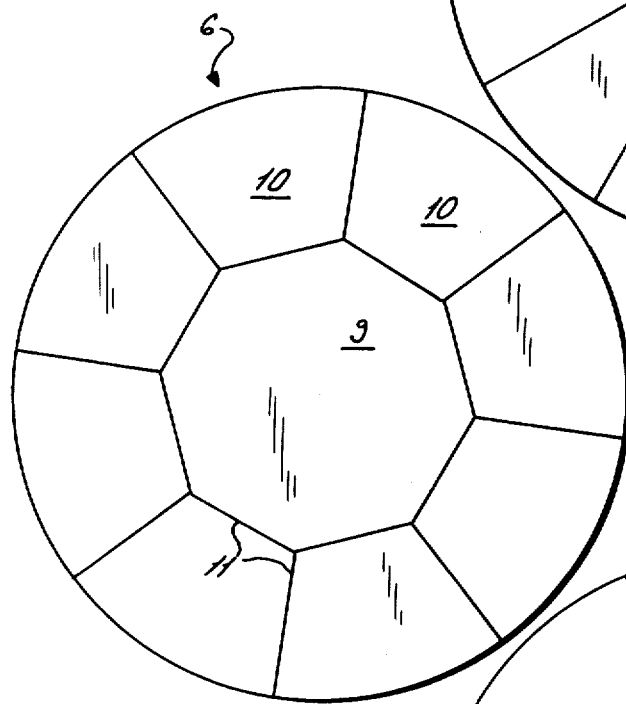
FIG. 1B is a view of the intermediate layer thereof.
Figure 1C:
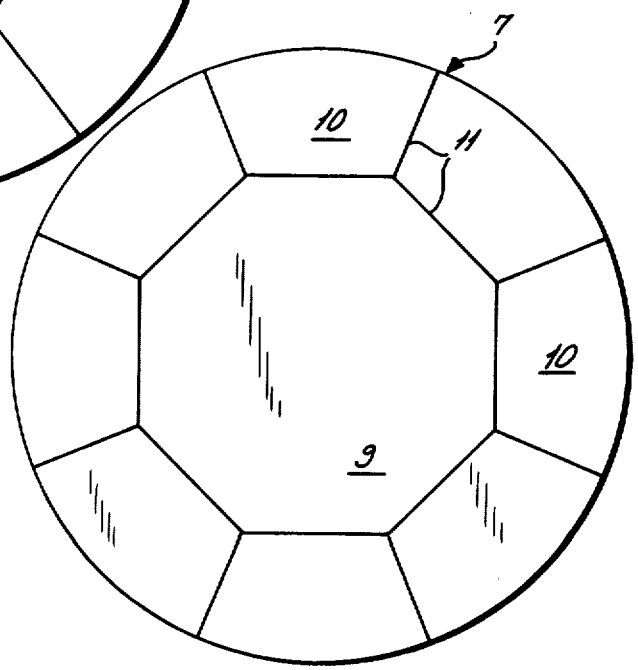
FIG. 1C is a view of the third cover layer.

The cover 3, 103 is composed of a plurality of layers 5–8, three of which are shown in some detail in FIGS. 1A–1C. The cover 3 is held on the vessel 2 with prestressing tensioning cables 4.

Figure 2:
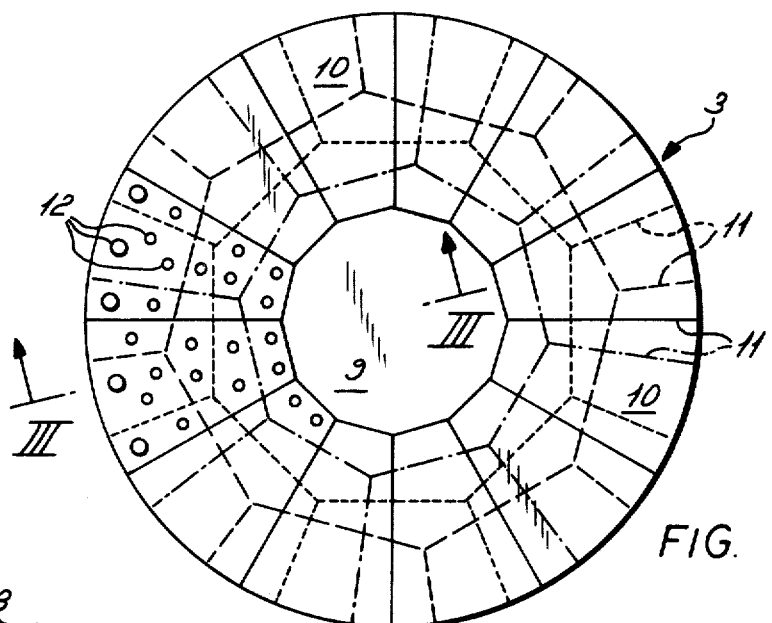
FIG. 2 is a plan view of the assembled cover with the tensioning passages aligned.

Each of the layers 5–8 comprises a central member 9 and a plurality of sector-shaped members 10. The central member 9 is polygonal and these layers are disposed (see FIG. 2) so that the joints between adjacent members of each layer are offset from the joints between the members of the layers thereabove or therebelow. The staggered joints are represented at 11.

The central member 9 of each layer and the sectoral members 10 thereof are formed with tensioning passages 12 which register with one another (FIG. 3) when the layers are in their proper positions with the joints of adjoining layers offset from one another.

Figure 5:
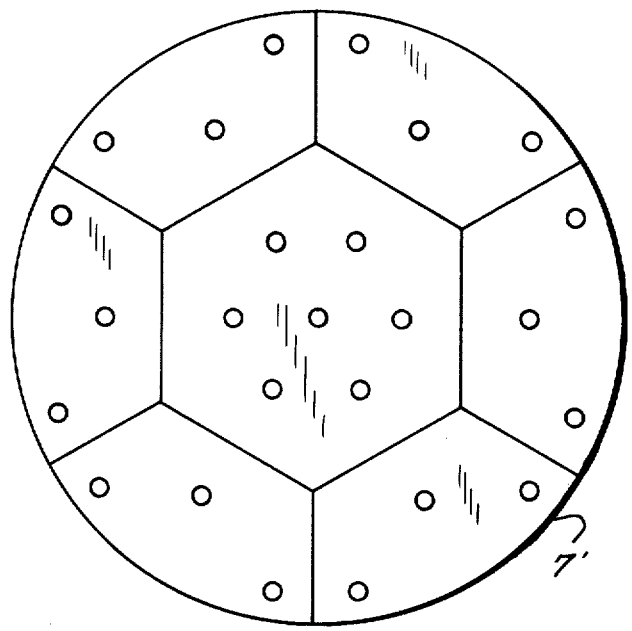
FIG. 5 is a plan view of a layer of the cover which can be substituted for the layer of FIG. 1C.

As can be seen from FIGS. 1B and 1C, the members of the layers may be geometrically similar but of different size although the layers may also have slightly different geometrical shapes (compare layer 5 with layers 6 and 7) if desired. Uniformity of geometrical shape is however preferred. When the layer of FIG. 5 is substituted for that of FIG. 1C in the structure of FIG. 2, the fact that the layer 5 has a dodecahedral central member 9, that member 6 has an orthogonal central member and member 7' (FIG. 5) has a hexagonal central member further insuring offsetting of the joint.

Figure 4:
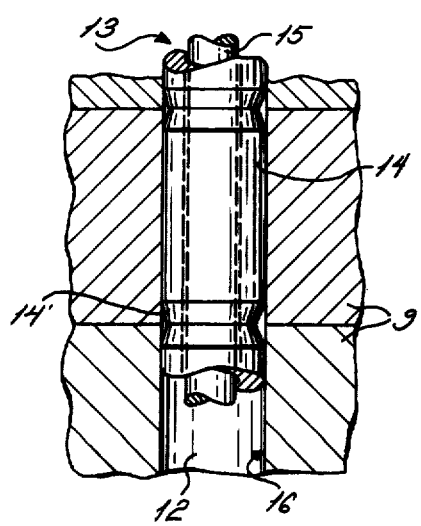
FIG. 4 is detail of the region IV of FIG. 3.

Tension devices 13 are received in each set of registering passages 12. The tensioning devices 13 comprise upsetting sleeves 14 and tensioning cables 15 received therein. When the head of each tensioning cable 15 bears upon the upper end of the respective sleeve 14 and the nut is tightened against the other end of the upsetting sleeve, the sleeve is spread outwardly to frictionally engage the cylindrical wall 16 of the tensioning passage. The sleeve 14 and the passage 12 are thus both of circular cross section to facilitate a uniform engagement of the sleeve with the wall of the passage. The surface 4 with which the sleeve engages the passage wall 16 is substantially uniform and the sleeve may have recesses, or convergent portions at 14' (FIG. 4) at the interfaces between the layers to prevent engagement with edges of the latter. The individual layers 5-8 can be composed of different materials as has been indicated by different hatching in FIGS. 3 and 4.

Figure 6:
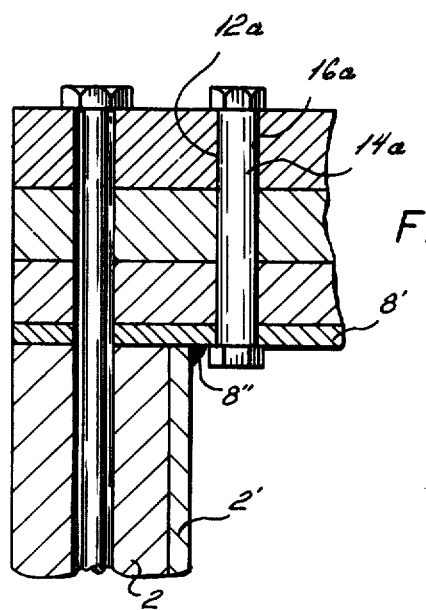
FIG. 6 is a view similar to FIG. 3 showing another feature of the invention.

As can be seen in FIG. 6, the lower layer 8' of the cover can be composed of steel sheet which is welded at 8" to the liner 2' of the cylindrical wall 2. In this embodiment the tensioning device is a bolt 14a which is shrunk by cooling before it is inserted into the passage 12a so that, upon expansion, it snugly engages the wall 16a of the passage. The bolt is tightened in place between the usual head and nut.

I claim:

1. A pressure vessel especially for a nuclear reactor, comprising a cylindrical shell and at least one cover mounted on said shell and spanning the interior thereof, said cover comprising a plurality of generally planar superposed layers each of said layers comprising a central member and a plurality of sector shaped members surrounding said central member and bearing upon one another and upon said central member at respective joints, the joints of each layer being offset from the joints of the next-adjacent layer, said layers having mutually aligned passages forming throughgoing channels in said cover, and respective tensioning devices extending through said channels and traversing all of said layers and forming shear-resistant means between the layers of said cover, said tensioning devices bearing upon the upper and lower layers perpendicularly thereto.

2. The vessel defined in claim 1 wherein the members of at least two of said layers have geometrically similar shapes but different sizes.

3. The vessel defined in claim 1 wherein said tensioning devices each comprise an upsetting sleeve and a tensioning cable traversing said sleeve and urging said sleeve outwardly against the walls of the respective passages.

4. The vessel defined in claim 1 wherein said tensioning devices comprise bolts traversing said passages and frictionally engaging the walls of said passages.

5. The vessel defined in claim 1 wherein said layers are composed of different material.

6. The vessel defined in claim 1 wherein each of said central members is polygonal and the outer peripheries of said layers are circular, said tensioning devices comprising means traversing said layers and frictionally engaging means substantially uniformly over the length of said devices.

* * * * *